United States Patent
Pindrock et al.

(10) Patent No.: US 10,486,185 B2
(45) Date of Patent: Nov. 26, 2019

(54) POSITIONING DEVICE IN A MELTING UNIT OF A HOT MELT ADHESIVE SYSTEM

(71) Applicant: Illinois Tool Works Inc., Glenview, IL (US)

(72) Inventors: Alan Pindrock, Hendersonville, TN (US); Grant McGuffey, Springfield, TN (US)

(73) Assignee: Illinois Tool Works Inc., Glenview, IL (US)

( * ) Notice: Subject to any disclaimer, the term of this patent is extended or adjusted under 35 U.S.C. 154(b) by 40 days.

(21) Appl. No.: 15/355,552

(22) Filed: Nov. 18, 2016

(65) Prior Publication Data

US 2017/0144185 A1    May 25, 2017

Related U.S. Application Data

(60) Provisional application No. 62/258,126, filed on Nov. 20, 2015.

(51) Int. Cl.
*B05C 11/10* (2006.01)
*B29B 13/02* (2006.01)

(52) U.S. Cl.
CPC ........ *B05C 11/1042* (2013.01); *B29B 13/022* (2013.01)

(58) Field of Classification Search
CPC .......................... B05C 11/1042; B29B 13/022
USPC ............................................ 222/146.2, 146.5
See application file for complete search history.

(56) References Cited

U.S. PATENT DOCUMENTS

| | | | | |
|---|---|---|---|---|
| 4,505,669 A | * | 3/1985 | Rogers | B05C 11/1042 126/343.5 A |
| 4,641,764 A | * | 2/1987 | Faulkner | B29B 13/022 126/343.5 A |
| 5,775,542 A | * | 7/1998 | Field | F27D 99/00 141/82 |
| 5,814,790 A | * | 9/1998 | Bondeson | B29B 13/022 219/421 |
| 5,919,384 A | * | 7/1999 | Reifenberger | B05C 11/1042 219/421 |
| 6,039,217 A | * | 3/2000 | Faulkner, III | B05C 11/1042 222/146.5 |
| 6,175,101 B1 | * | 1/2001 | Miller | B29B 13/022 219/422 |
| 7,015,427 B1 | * | 3/2006 | Jeter | B05C 11/1042 219/421 |
| 2017/0066004 A1 | * | 3/2017 | Stegall | B05C 5/001 |

* cited by examiner

*Primary Examiner* — Donnell A Long
(74) *Attorney, Agent, or Firm* — Levenfeld Pearlstein, LLC

(57) ABSTRACT

A melter of a fluid delivery device includes a loading chamber, a hopper disposed beneath the loading chamber and connected to the loading chamber, and a positioning device disposed in the hopper extending to a first height from a bottom of the hopper. The positioning device is configured to penetrate an adhesive slug received in the hopper from the loading chamber. The positioning device may be formed as a rod having a proximal end and a distal end extending to the first height.

10 Claims, 4 Drawing Sheets

POSITIONING DEVICE IN A MELTING UNIT OF A HOT MELT ADHESIVE SYSTEM

BACKGROUND

Adhesive hot melt systems may include a melting unit for melting a hot melt adhesive and an application device for applying the adhesive on an article. The melting unit may be fluidically coupled to the application device and deliver the melted adhesive to the application device. The hot melt adhesive may initially be in the form of a solid adhesive slug contained in, for example, a 55 gallon drum.

In a known configuration, the melting unit includes a first receptacle positioned above a second receptacle. The first receptacle is configured to receive the adhesive slug disposed in the container. Heat is applied to the container which causes an outer periphery of the adhesive slug to melt. Accordingly, a bond between the adhesive slug and the container may be weakened such that the slug may drop from the drum, under gravity, through an opening and into the second receptacle. The second receptacle includes heating units to melt the slug. The melted adhesive may then be supplied to the application device.

However, there is potential for uneven heating of the adhesive slug in the first receptacle, which may cause the adhesive slug to drop unevenly from the container. When the slug drops unevenly into the second receptacle, it may tip onto its side and/or into contact with an interior wall of the second receptacle. This may damage interior components of the second receptacle, such as the heating elements or components of a pumping system used to deliver the melted adhesive to the application device.

Accordingly, it is desirable to provide a melting unit having a receptacle configured to received a dropped slug of adhesive and substantially hold the slug against inadvertent movement in the receptacle.

SUMMARY

According to one aspect, there is provided a melter of a fluid delivery device comprising a loading chamber, a hopper disposed beneath and connected to the loading chamber, and a positioning device disposed in the hopper extending to a first height from a bottom of the hopper. The positioning device is configured to penetrate an adhesive slug received in the hopper from the loading chamber.

According to another aspect, there is provided a positioning device for a melter of a fluid delivery device. The melter includes a loading chamber disposed above a hopper and the positioning device includes a rod having a proximal end and a distal end. The rod extends to a first height and is configured for positioning within the hopper at a location for receiving an adhesive slug from the loading chamber. The rod is configured to penetrate the adhesive slug.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
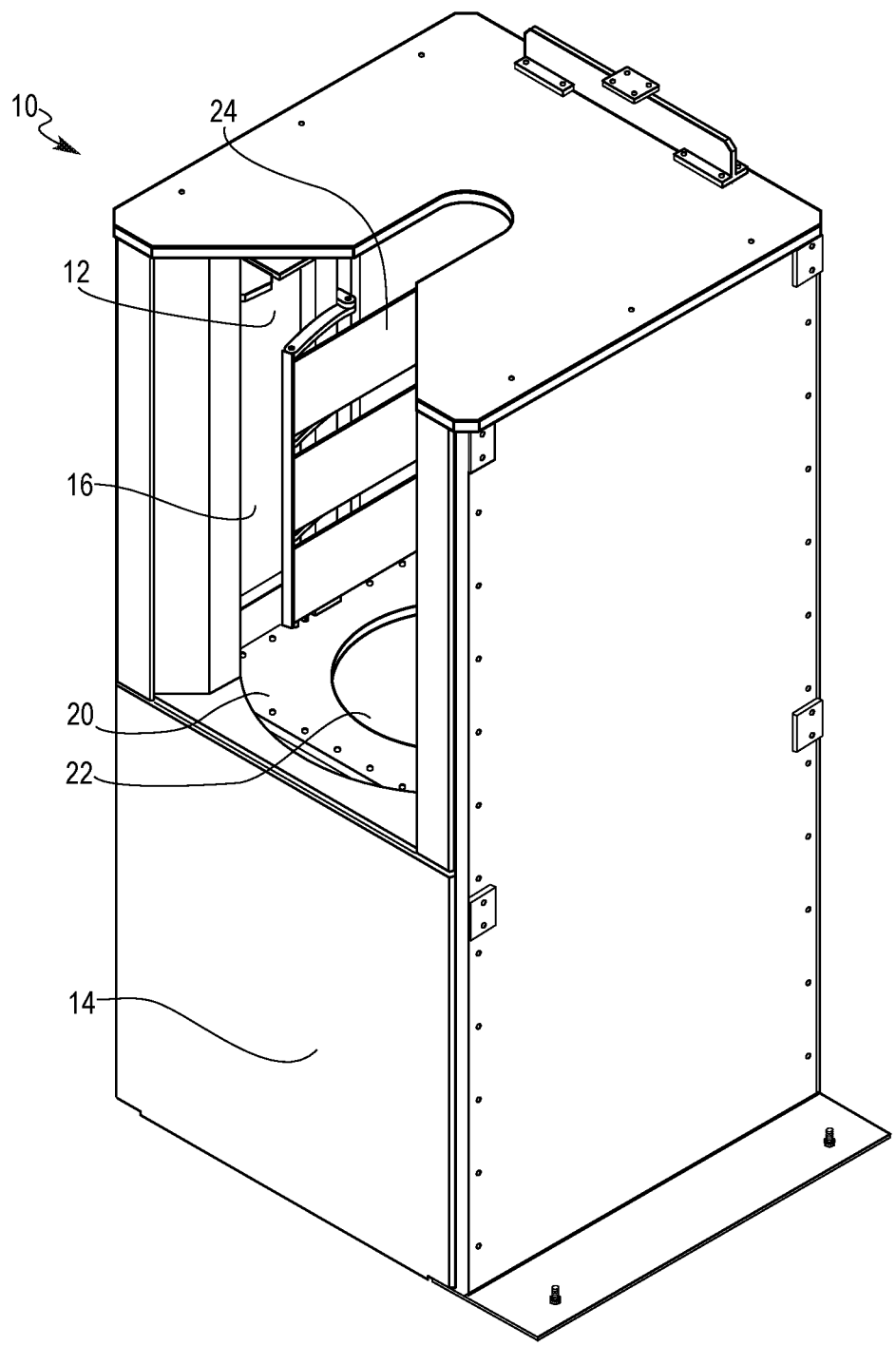
FIG. 1 is a perspective view of a melter of a fluid delivery device having a door in an open position according to an embodiment described herein.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 2:
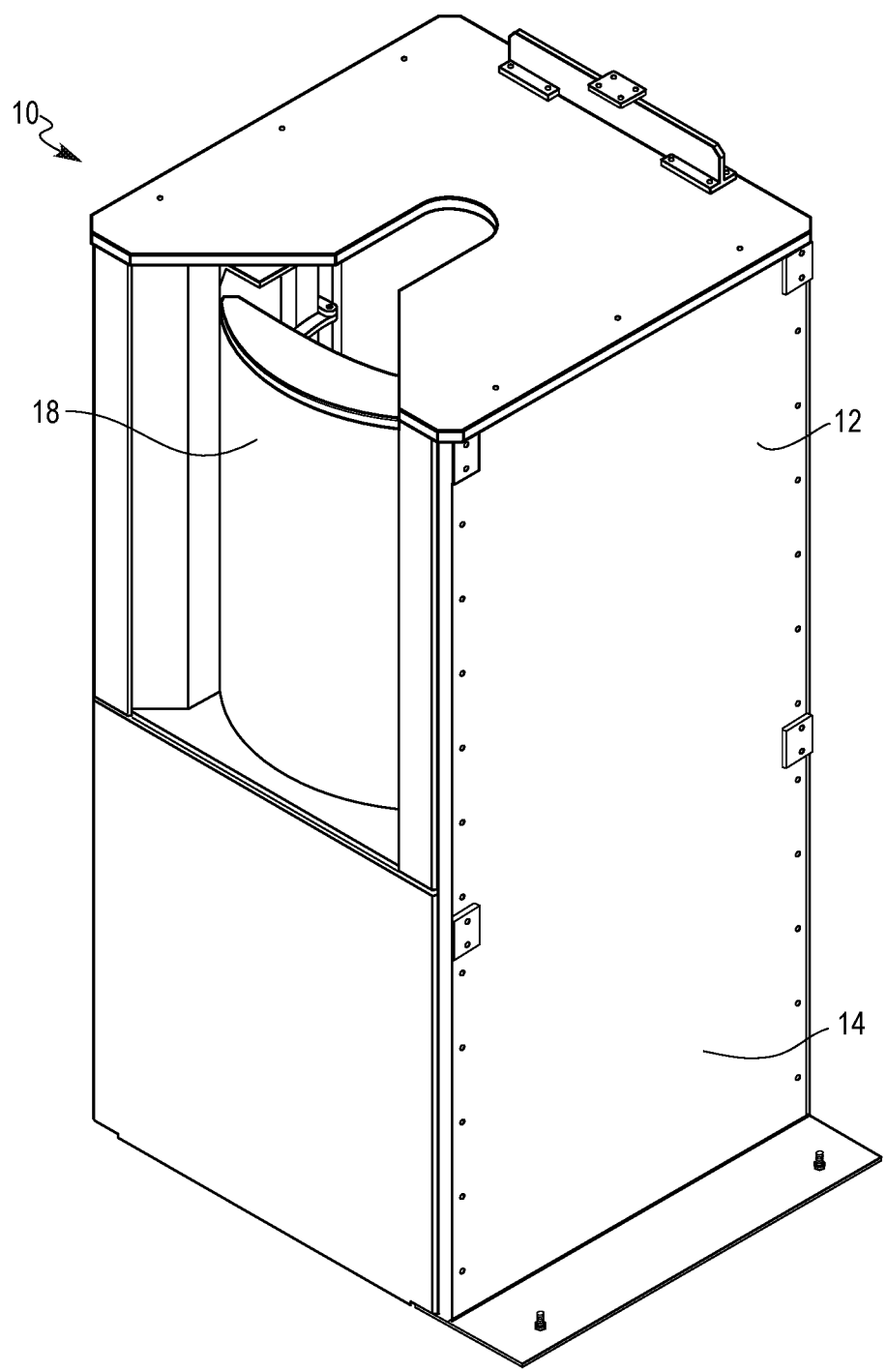
FIG. 2 is a perspective view of the melter of FIG. 1, with a door in a closed position, according to an embodiment described herein.

According to the embodiments described herein, and with reference to FIGS. 1 and 2, a melter 10 of a fluid delivery device is configured to melt a hot melt adhesive and supply the melted adhesive to a fluid application device (not shown). The melter 10 may receive the hot melt adhesive in the form of a solid adhesive slug held in a container. For example, the melter 10 may receive a 55 gallon drum containing the adhesive slug.

In one embodiment, the melter 10 includes a loading chamber 12 and a hopper 14 connected to the loading chamber 12. The loading chamber 12 includes an ingress/egress opening 16 through which the supply of hot melt adhesive may be received into and removed from an interior portion of the loading chamber 12. For example, a 55 gallon drum container a hot melt adhesive slug may be received in the loading chamber 12 through the ingress/egress opening 16. The drum may also be removed from the loading chamber 12 via the ingress/egress opening 16, for example, after the adhesive slug is removed from the drum. A door 18 may selectively open and close the opening 16.

The loading chamber 12 is disposed above the hopper 14. The loading chamber 12 may be formed continuously with the hopper 14. For example, the loading chamber 12 may generally be defined as an area within the hopper 14 where a container holding the adhesive slug is initially received and heated to release the adhesive slug from the container. The hopper 14 may generally be defined as an area to which the adhesive slug drops from the container, is melted, and from which the melted adhesive is pumped to an adhesive application device. Alternatively, a partition 20 may separate the loading chamber 12 from the hopper 14. A passage 22 may be formed in the partition 20 to allow for receipt of the adhesive slug in the hopper, as described further below.

The loading chamber 12 is configured to receive the adhesive supply therein through the opening 16. In one embodiment, the adhesive supply, i.e., the container (not shown) having the adhesive slug (not shown) disposed therein, may be held above the hopper 14. For example, an upper end of the container may be gripped by a chuck (not shown) or similar device to suspend the adhesive supply within the loading chamber 12 over hopper 14. In one embodiment, the adhesive supply is held over the passage 22.

Referring to FIG. 1, the loading chamber 12 includes one or more first heating elements 24. The one or more first heating elements 24 may be energized to transfer heat to the container. In one embodiment, the first heating element 24 may be brought into contact with the container to heat the container and the adhesive slug by conduction heating. In another embodiment, the first heating element 24 may heat the container to transfer heat to the container, and in turn the hot melt adhesive, within the container by radiant or convention heating. That is, the first heating element may be positioned in close proximity, or sufficiently near, to the container to heat the container and the adhesive slug.

The adhesive slug is initially bonded to an interior portion of the container. Sufficient heating of the container and the adhesive slug causes a radially outer portion of the adhesive slug to melt, thereby weakening the bond between the adhesive slug and the container. Accordingly, the adhesive slug may drop from an open, bottom end of the container under the weight of the adhesive slug when the bond has sufficiently weakened. The slug then accelerates under gravity and is received in the hopper 14.

Figure 3:
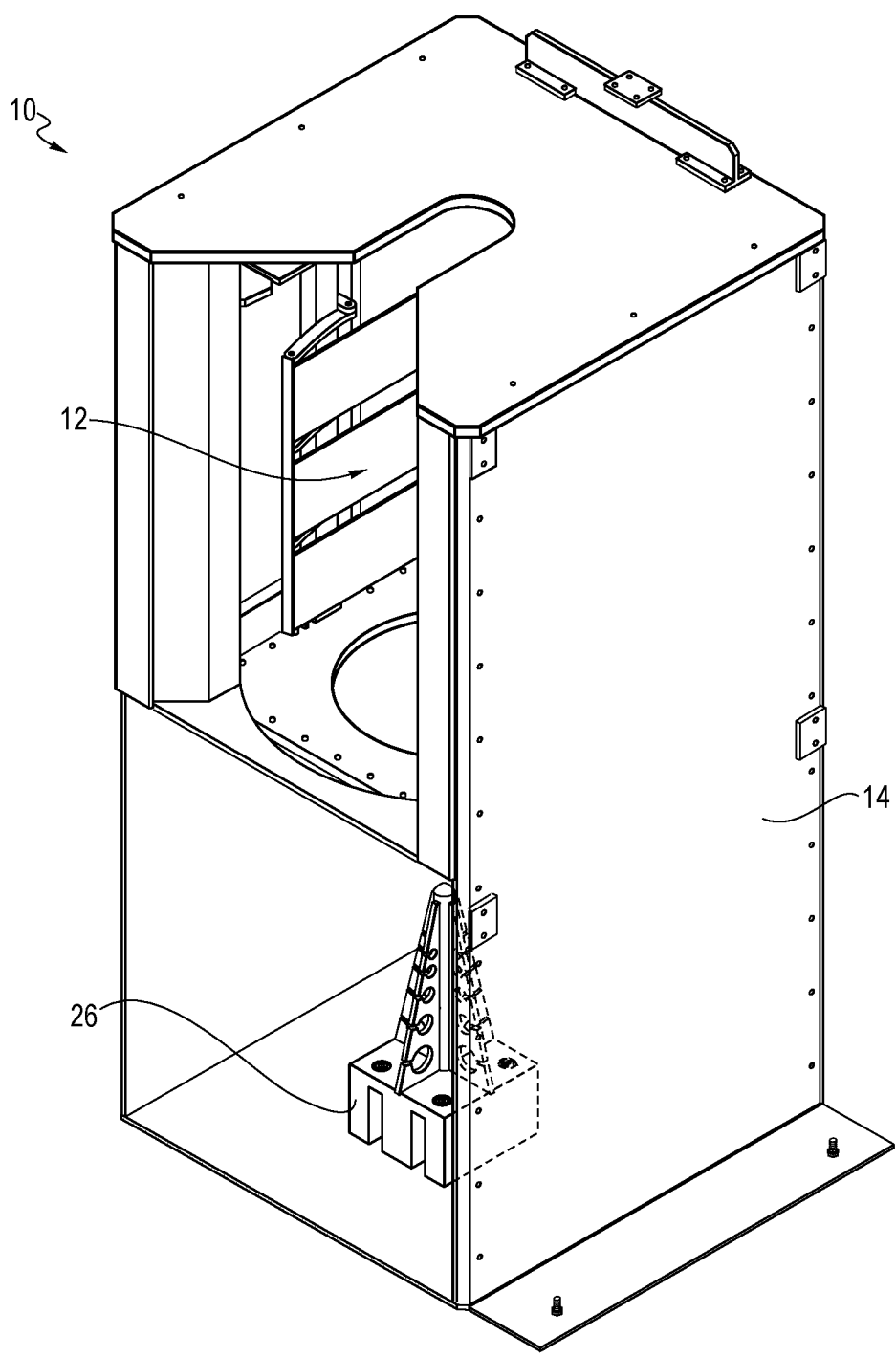
FIG. 3 is a front cross-sectional view of the melter of FIGS. 1 and 2, according to an embodiment described herein.
Figure 4:
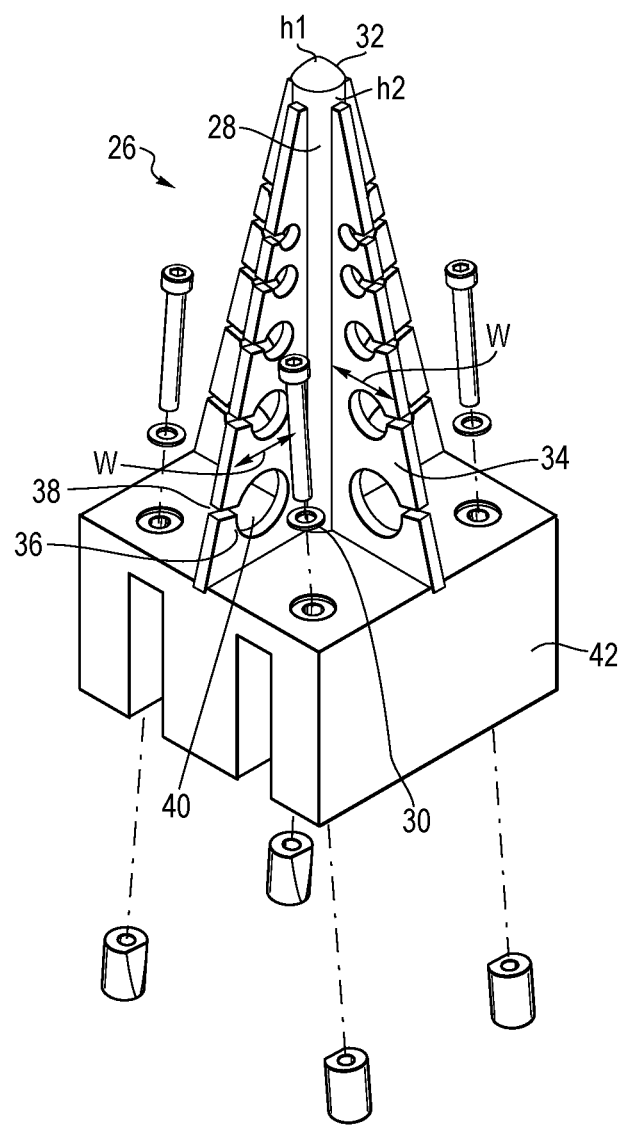
FIG. 4 is a perspective view of a positioning device according to an embodiment described herein.

Referring to FIGS. 3 and 4, the hopper 14 includes a positioning device 26 extending upwardly from a bottom surface thereof. In one embodiment, the positioning device 26 is positioned within a footprint of where the adhesive slug is expected to fall. For example, the positioning device 26 may be positioned substantially under a location where the chuck holds the adhesive supply. In one configuration, the positioning device 26 may be centered, or positioned coaxially with the chuck or passage 22, and turn, the adhesive supply. The positioning device 26 is configured to penetrate a bottom of the adhesive slug as the adhesive slug drops toward a bottom of the hopper 14. This position may correspond substantially with a center of the bottom of the hopper 14. Accordingly, the positioning device 26 may hold the adhesive slug substantially in the position and orientation at which the slug was received and reduce or eliminate bouncing, rolling or other position shifts of the adhesive slug within the hopper 14. In one embodiment, the positioning device 26 may substantially center the adhesive slug within the hopper.

Referring still to FIGS. 3 and 4, in one embodiment, the positioning device 26 includes a rod or spike 28 extending upward to a first height 'h1' measured from the bottom of the hopper 14. The rod 28 has a proximal end 30 and a distal end 32 at the first height 'h1.' The distal end 32 may be formed with a reduced thickness section, such as a blade or point to assist in penetration into adhesive slug.

The positioning device 26 may also include one or more flanges 34 extending from the rod or spike 28. In one embodiment, each flange 34 may increase in width 'W' moving in a direction from the distal end 32 to the proximal end 30. The one or more flanges 34 may extend to a second height 'h2' that is less than the first height 'h1,' so that a portion of the rod 28 extends vertically beyond the one or more flanges 34. In one embodiment, the positioning device 26 includes four flanges 34, equally spaced about a periphery of the rod 28. However, the present disclosure is not limited to this embodiment and more or fewer flanges 34 may be included as desired. In one embodiment, the rod or spike 28 may be substantially circular in cross section, and the one or more flanges 34 may extend radially outward from the rod or spike 28. The flanges 34 may be substantially triangular in shape, but are not limited thereto. In another embodiment, the rod spike 28 may be formed by the common joint connecting two more flanges 34 together. In such an embodiment, the rod or spike 28 and flanges 34 may extend to the same height.

Each of the one or more flanges 34 may be formed with one or more open slots 36. In one embodiment, each slot 36 includes a neck 38 and a body 40 formed continuously with the neck 38. The slot 36 may extend through an entire thickness of the flange 34 and the neck 38 may be open along a periphery of each flange 34 in the width direction. The body 40 may be substantially circular in shape, but is not limited thereto.

In one embodiment, each flange 34 includes more than one open slot 36. Further, in one embodiment, a diameter of respective body portions 40 on a flange increases as the width of the flange 34 increases. In one configuration, each flange 34 may include five open slots 36. However, the present disclosure is not limited to this configuration, and it is understood that each flange 34 may include more or fewer open slots 36, and the different flanges 34 may include different numbers of slots 36 as desired. In use, open slots 36 may increase connection strength of the adhesive slug to the positioning device 26. For example, the adhesive slug, while heated, may form around the slots 36 so as to extend therethrough to form a positive interlock with the positioning device 26.

In some embodiments, the positioning device 26 may also include a base 42 from the which the rod 28 and one or more flanges 34 extend. The base 42 may be secured to the bottom of the hopper 14 and the rod 28 and/or one or more flanges 34 may be secured to the base 42.

It is also contemplated that the positioning device 26, itself, may be heated. That is, the positioning device 26 may include internal heaters, such as heating coils (not shown) internal to the rod 28 and/or the flanges 34. Such a configuration can facilitate heating and melting of the adhesive slug, thereby reducing the time needed to prepare the adhesive material for delivery to the fluid application device.

The positioning device 26 is not limited to these configurations, however. For example, the positioning device 26 may include more than one rod or spike 28. Optionally, one or more of the rod or spikes 28 may include the one or more flanges 34.

The hopper 14 includes a second heating element (not shown). Accordingly, upon receipt of the adhesive slug in the hopper 14 and on the positioning device 26, the adhesive slug may continue to be heated and subsequently melted. In one embodiment, with the adhesive slug centered in the hopper 14 on the positioning device 26, the adhesive slug may be uniformly melted. The melted adhesive may then be delivered, for example, by a pump, to a fluid application device (not shown). The fluid application device may then apply the melted adhesive to an article, such as, but not limited to, a fabric or a strand of material. The fluid application device may be used in strand coating applications, where a nozzle of the fluid application device discharges the melted adhesive onto a strand of material, such that strand may be subsequently bonded to a substrate, such as a woven or non-woven fabric. Alternatively, the fluid application device may apply the adhesive directly to a substrate, such as the woven or non-woven fabric. The nozzle of the fluid application device may be either a contact or non-contact nozzle. In some embodiments, the melter 10 described herein may be used with one or more fluid application devices to dispense adhesives for use in disposable hygiene products, such as a baby diapers, adult diapers, feminine hygiene products, medical or hospital pads, and other non-woven applications.

It is understood that various features and components described in any of the embodiments above may be used in combination with, or in place of other features and components described in different embodiments above.

It should also be understood that various changes and modifications to the presently disclosed embodiments will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A melter of a fluid delivery device comprising:
    a loading chamber having one or more first heating elements;
    a hopper disposed beneath the loading chamber and connected to the loading chamber; and
    a positioning device disposed in the hopper, the positioning device extending to distal end at a first height from a bottom of the hopper,
    wherein the distal end is within the hopper and vertically spaced from the loading chamber, and the positioning device is configured to penetrate an adhesive slug received in the hopper from the loading chamber.

2. The melter of claim 1, wherein the positioning device includes a rod extending to the distal end, the rod further including a proximal end.

3. The melter of claim 2, wherein the rod includes a section of decreasing thickness in a direction toward the distal end.

4. The melter of claim 3, wherein the section of decreasing thickness extends to the distal end.

5. The melter of claim 2, the positioning device further comprising one or more flanges extending outwardly from the rod.

6. The melter of claim 5, wherein the one or more flanges extend to a second height less than the first height.

7. The melter of claim 5, wherein the one or more flanges increase in width moving in a direction from the distal end to the proximal end.

8. The melter of claim 5, wherein the one or more flanges include one or more open slots.

9. The melter of claim 8, wherein each open slot includes a neck and a body extending through an entire thickness of a respective flange.

10. The melter of claim 2, wherein the positioning device further includes a base, and the rod extends from the base.

* * * * *